United States Patent
Varela

[11] Patent Number: 6,069,314
[45] Date of Patent: May 30, 2000

[54] EMITTER OF IONS FOR A LIGHTNING ROD WITH A PARABOLIC REFLECTOR

[76] Inventor: Manuel Domingo Varela, Guemes 4854 1, piso Buenos Aires, Argentina

[21] Appl. No.: 08/857,510

[22] Filed: May 16, 1997

[51] Int. Cl.[7] .................................................. H02G 13/00
[52] U.S. Cl. ....................................................... 174/3; 174/2
[58] Field of Search ............................... 174/2, 3, 4, 5 R, 174/55 G, 6, 7

[56] References Cited

U.S. PATENT DOCUMENTS

| 357,050 | 2/1887 | Vail | 361/117 |
|---|---|---|---|
| 414,943 | 11/1889 | Dewey | 174/4 R |
| 1,743,526 | 1/1930 | Cage | 174/2 |
| 2,854,499 | 9/1958 | Capart | 174/3 |
| 3,571,558 | 3/1971 | Hogan, Jr. | 219/130.4 |
| 4,180,698 | 12/1979 | Carpenter, Jr. | 174/2 |
| 4,228,479 | 10/1980 | Larigaldie et al. | 361/218 |
| 4,380,720 | 4/1983 | Fleck | 315/111.91 |
| 4,447,847 | 5/1984 | Drulard | 361/117 |
| 4,480,146 | 10/1984 | Invernizzi | 174/3 |
| 4,491,893 | 1/1985 | Toda | 313/318.02 |
| 4,518,816 | 5/1985 | Robert | 174/3 |
| 4,540,844 | 9/1985 | Sautereau et al. | 174/3 |
| 4,565,900 | 1/1986 | Arnau | 174/3 |
| 4,652,694 | 3/1987 | Goldman et al. | 174/3 |
| 4,760,213 | 7/1988 | Gumley | 174/3 |
| 4,878,149 | 10/1989 | Stiehl et al. | 361/230 |
| 5,043,527 | 8/1991 | Carpenter, Jr. | 174/2 |
| 5,073,678 | 12/1991 | Carpenter, Jr. | 174/2 |

FOREIGN PATENT DOCUMENTS

| 428942 | 5/1926 | Germany | 174/3 |
|---|---|---|---|
| 449180 | 11/1880 | United Kingdom | 174/3 |

*Primary Examiner*—Kristine Kincaid
*Assistant Examiner*—Kamand Cuneo
*Attorney, Agent, or Firm*—Robert E. Bushnell, Esq.

[57] ABSTRACT

A lightning rod is enshrouded by a large number of electrically isolated metallic points. When a storm cloud passes overhead, a charge is induced in the lightning rod, causing the metallic points positioned near the lightning rod to emit sparks, causing the air about the points to become ionized. These produced ions are accelerated by an electric field produced by two metallic plates, one being electrically connected to the induced charge in the lightning rod and the other being electrically isolated from the charge induced in the lightning rod. The acceleration of the produced ions is strong enough to produce more ions through an avalanching effect created when ions collide with other air molecules in the presence of the strong electric field. This large multiplicity of ions is transported by the electric field set up by the accelerator and guided by a collimator into the atmosphere surrounding the lightning rod apparatus to attract a lightning strike, thus protecting a larger area from the damaging effects of lightning strikes.

9 Claims, 4 Drawing Sheets

III - III'

IV - IV'

EMITTER OF IONS FOR A LIGHTNING ROD WITH A PARABOLIC REFLECTOR

FIELD OF THE INVENTION

The present invention relates to a lightning rod, and, more particularly, to a lightning rod with an improved emitter of ions. The structure presented produces a greater number of ions during a thunderstorm than earlier lightning rods, and accelerates, directs, and collimates the stream of produced ions into a narrow channel and expels the ions into the atmosphere about the lightning rod tip. The lightning rod presented in this invention affords greater protection and to a greater area than earlier lightning rods.

BACKGROUND OF THE INVENTION

Persons and property in the vicinity of a lightning rod can be protected by a lightning rod. A bare lightning rod is an electrically conductive object that is electrically connected to earth ground and protrudes vertically into the environment, a substantial distance above surrounding objects, thus attracting lightning that would otherwise strike nearby. The lightning rod provides a convenient path for the lightning stroke to ground. Protection from lightning can be enhanced if ionized gas is produced when a threatening storm cloud passes overhead. Ions from the ionized gas can cause the atmosphere around the lightning rod to become more conductive for the electrical current of lightning, thus encouraging a lightning stroke to hit the lightning rod, thereby reducing or eliminating the threat of a lightning stroke. Thus, it is advantageous, when protecting persons and property below a lightning rod, to generate ionized gas in the vicinity of a lightning rod whenever a storm cloud looms overhead.

The easiest and crudest way to produce ions is to point grounded sharp metal objects upwards towards a storm cloud. U.S. Pat. No. 357,050 for Lightning-Protector for Electrical Conductors to Vail discloses the use of grounded wire placed above items to be protected for the purpose of attracting lightning to the barbed wire as opposed to other structures in the vicinity, thus protecting other items in the vicinity of the barbed wire from lightning damage. The notion of discharging a charge form a pointed metallic body is described in U.S. Pat. No. 4,228,479 for a Device For The Production of a Gaseous Stream Carrying Electric Charges to Larigaldie et al. where a needle is used to dispel charge from an airplane by creating a Townsend, or corona, discharge in the vicinity of the needle.

U.S. Pat. No. 4,480,146 for Lightning Protector Assembly to Invernizzi states that an electrically conductive device positioned in the vicinity of a lightning rod point where the device is electrically isolated from the lightning rod and the ground conductor can produce electric discharge during a thunderstorm. Invernizzi suggests that improved lightning protection is achieved if an ionization is produced in the vicinity of the lightning rod point by the discharge of one or several electric arcs. This view is shared by Cage '526, Carpenter, Jr. '698, '527, and '678, U.S. Pat. No. 4,518,816 for a Lightning Conductor With Piezoelectric Device For Initiating the Corona Effect to Robert, and U.S. Pat. No. 4,565,900 for a Lightning Rod Construction to Arnau.

I have discovered that there exists a need for a lightning rod that produces a more sufficient and hence a much larger quantity of ions during a thunderstorm. I also believe that there is a need for a mechanism for guiding and directing ion streams produced by the lightning during the occurrence of phenomenon characterized by an increased risk of electrical discharge, such as thunderstorms.

SUMMARY OF THE INVENTION

It is therefore an object of the present invention to produce an improved process and apparatus for protecting persons and properties from injury and damage caused by a lightning strike.

It is also an object to provide a process and apparatus able to protect persons and property from the destruction potentially caused by lightning strikes over a area wider than the area protected by earlier lightning rods.

It is another object to provide an apparatus that produces a much larger quantity of ions during a thunderstorm than are produced by earlier designs for lightning rods.

It is further an object to provide a lightning rod assembly that enshrouds its lightning rod from end to end with a plurality of spark producing electrically isolated metallic points.

It is also an object to provide a lightening rod assembly able to produce and to accelerate ions to such a velocity to create more ions through collisions with other molecules, and to thus produce an avalanche effect in the number of ions generated.

It is still another object to facilitate the production of a return tracer in a lightning stroke by focusing a beam of charged particles near the tip of a lightning rod.

These and other objects may be realized in accordance with the principles of the present invention by using a lightning rod that is completely enshrouded by a multiplicity of electrically isolated metallic points. When a thunderstorm passes over-head, the charged cloud induces an opposite charge in the lightning rod. This opposite charge produces sparks between the lightning rod and the electrically isolated metallic points disposed cylindrically about the lightning rod. These sparks produce ions in the atmosphere between the lightning rod and the shroud of metallic points. This ionization is enhanced by accelerating the ions in an electric field set up by an accelerator. A parabolic conductor focusses the accelerating ions towards the tip of the lightning rod. The enhanced ionization about the tip of the lightning rod helps break down the dielectric rigidity of the atmosphere about the tip of the lightning rod and facilitates in the formation of a return tracer, thus enabling the lightning rod to protect a larger region of landscape than earlier lightning rods.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

An effective lightning rod can protect a much larger area from the harmful effects of a lightning stroke than a less effective lightning rod. This invention seeks to produce a more effective lightning rod by producing more ions when a storm cloud passes overhead, and accelerating, collimating, and directing the ions so that a large number of positive ions are formed about the tip of a lightning rod, facilitating the production of a return tracer in a lightning stroke. This will prevent damage to surrounding property and persons should a lightning stroke occur.

Figure 1:
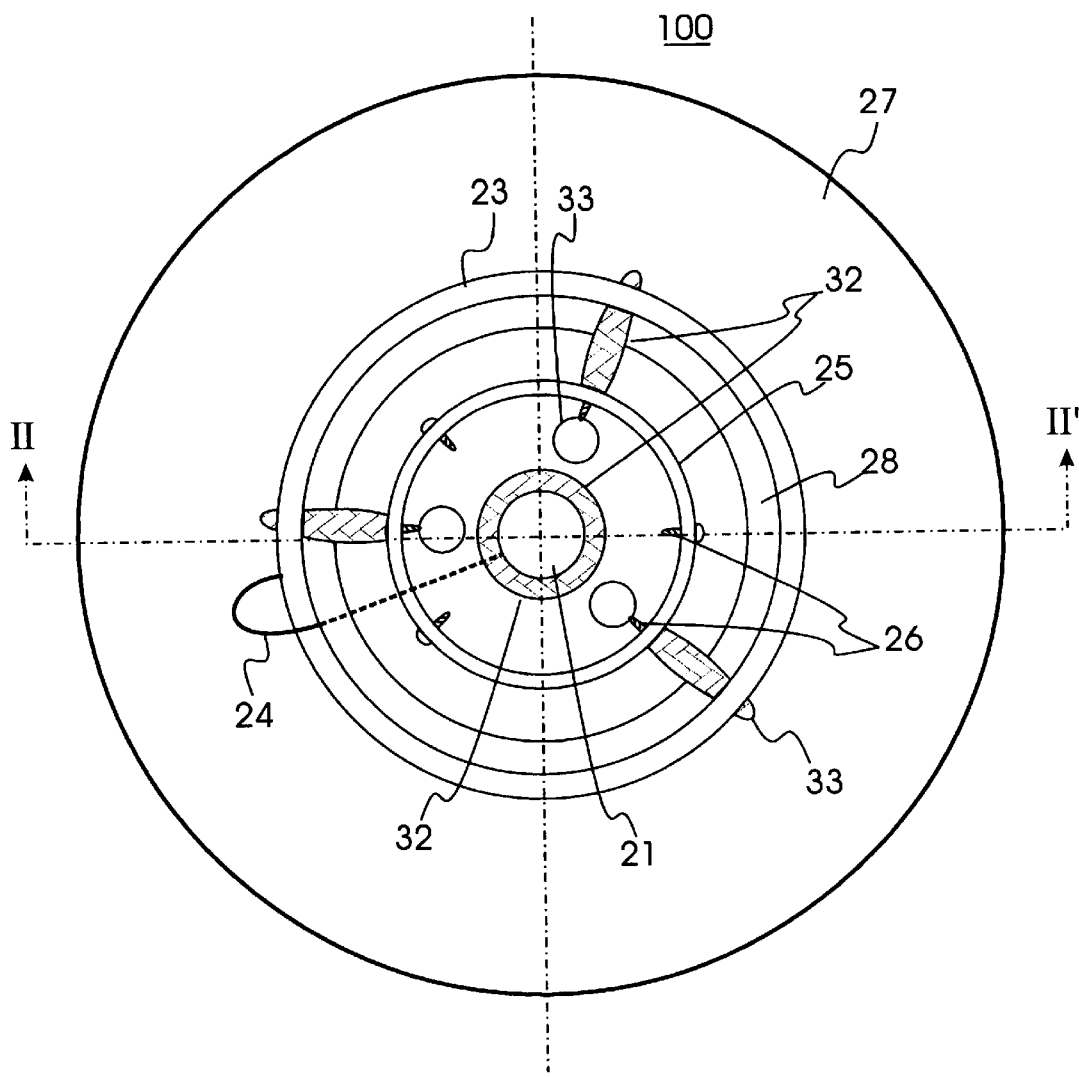
FIG. 1 is a plan cross sectional view of the lightning rod apparatus disclosed in the present invention, looking down from the tip of the lightning rod.
Figure 2:
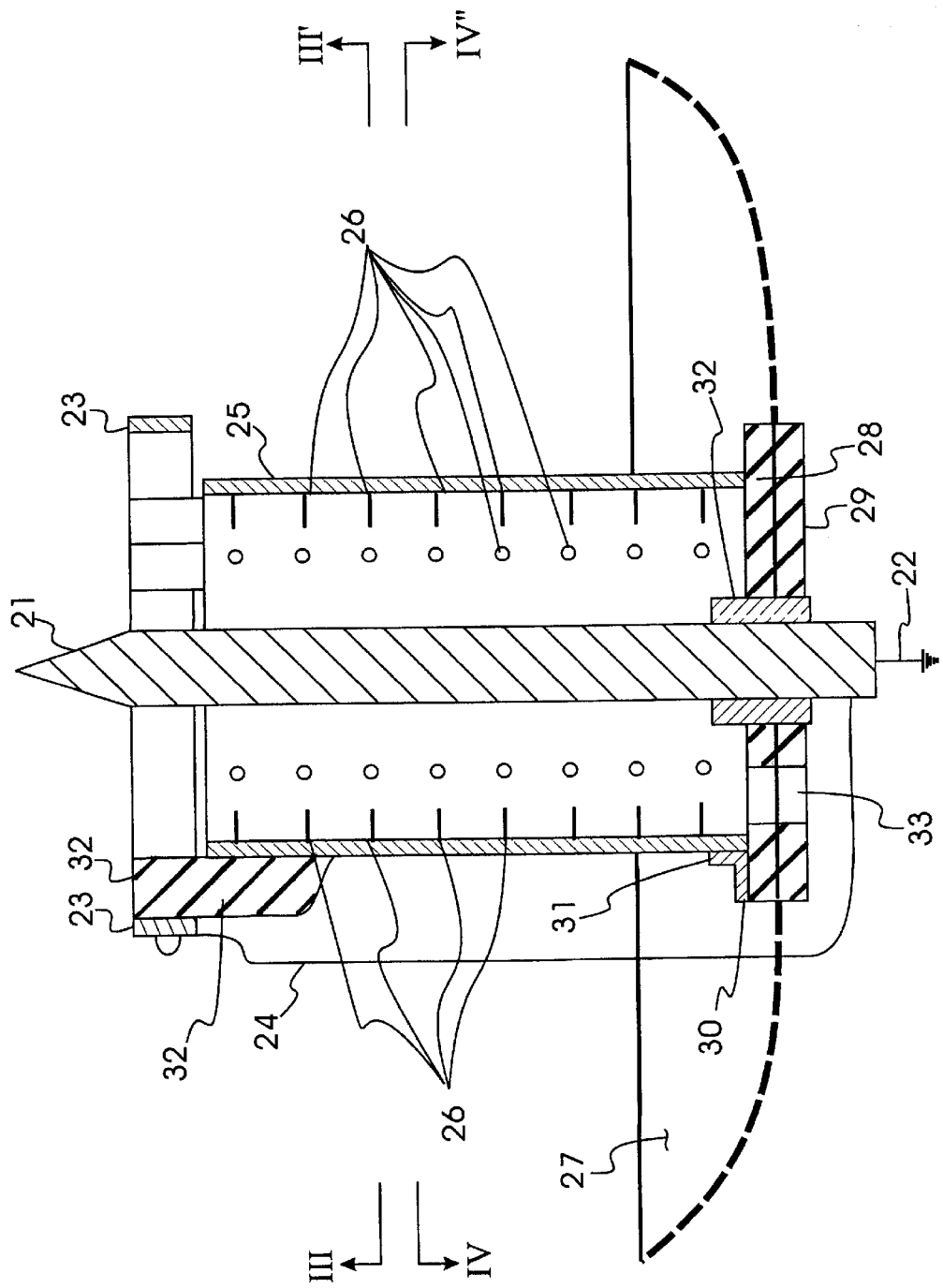
FIG. 2 is an elevational cross sectional view of the lightning rod apparatus shown in FIG. 1 taken along and in the direction of II-II'.
Figure 3:
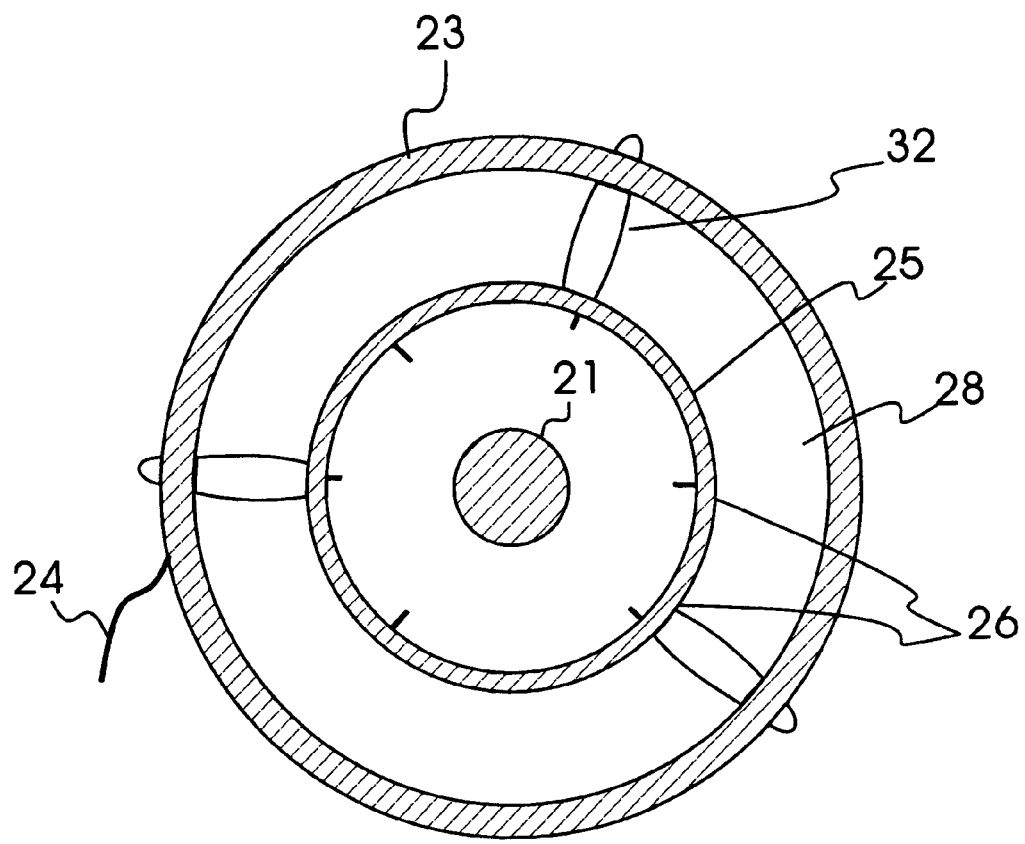
FIG. 3 is a view of the lightning rod apparatus taken in the direction of III-III' of FIG. 2.
Figure 4:
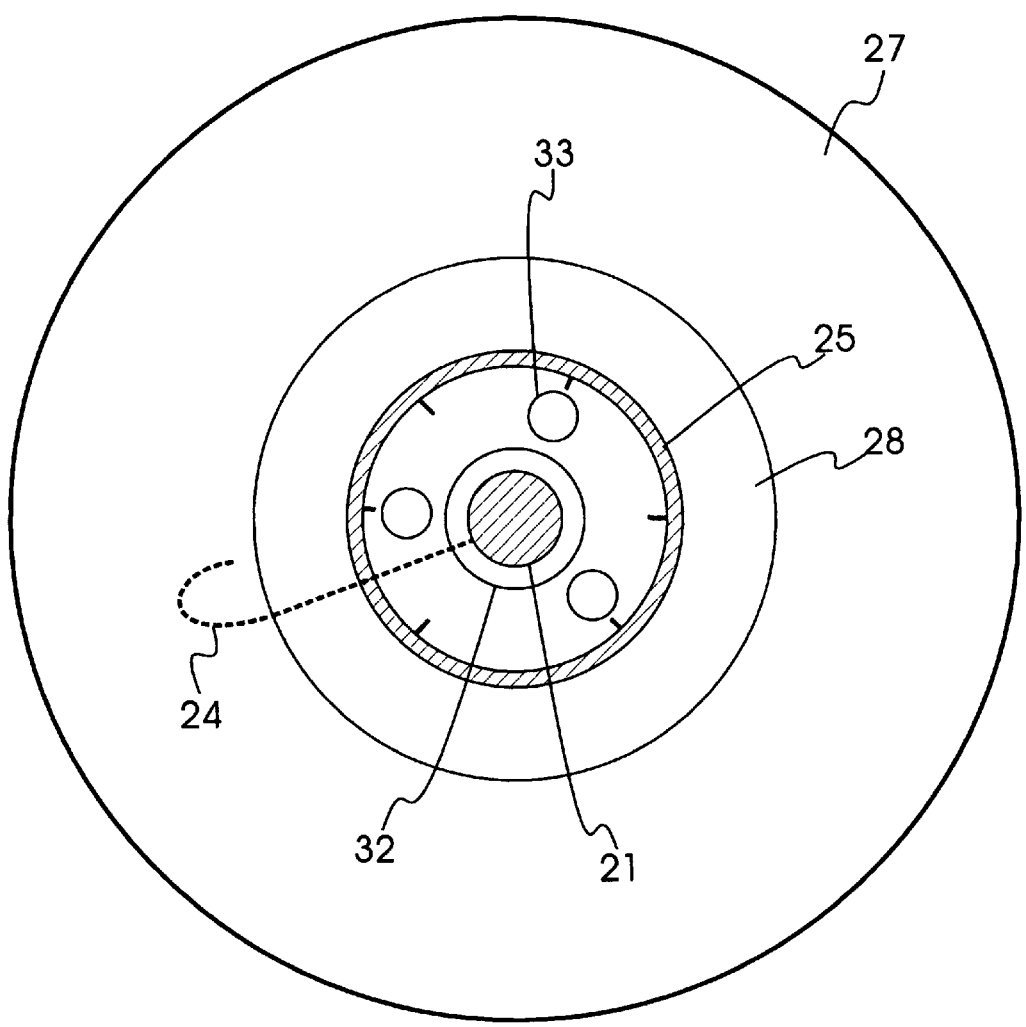
FIG. 4 is a view of the lightning rod apparatus taken in the direction of IV-IV' of FIG. 2.

Turning to the figures, FIG. 1 is a view of the lightning rod apparatus 100 looking down from the tip of the lightning rod 21. FIG. 2 is a cross sectional view of FIG. 1. FIG. 3 is a cross sectional view of FIG. 2 looking from the middle of the lightning rod towards the tip of the lightning rod. FIG. 4 is a cross sectional view of FIG. 2 looking from the middle of the lightning rod towards the base of the lightning rod. Note that lightning rod 21 extends through the center of device 100. The lightning rod 21 is connected to ground via a lead-in cable 22. An annular flange 23 is formed around the tip of the lightning rod 21. Annular flange 23 is electrically connected to lightning rod 21 via insulated cable 24 as shown in FIG. 2. Displaced radially around the entire circumference of lightning rod 21 is an isolated metallic emitter 25 that is electrically isolated from lightning rod 21 by insulator 35. Isolated metallic emitter 25 takes the shape of a cylinder that nearly encapsulates the entire length of lightning rod 21. Protruding radially inward from isolated metallic emitter 25 and towards lightning rod 21 are numerous metallic points or electrodes 26. These metallic points 26 form a cylindrical array or a cylindrical shroud about lightning rod 21. FIG. 1 shows six metallic points at one particular cross section of lightning rod 21. FIG. 2 shows that the metallic points 26 extend inward from isolated metallic emitter 25 over nearly the entire length of the lightning rod 21. As a storm cloud passes over the lightning rod 21, the negative charge found at the base of the storm cloud induces a positive charge in the lightning rod 21. Meanwhile, the electrodes 26 are electrically isolated from the lightning rod 21. The large potential difference in the tiny space between electrodes 26 and lightning rod 21 cause ions to be formed from the tips of metallic points 26. The combination of the charged lightning rod 21, the emitter 25 and the electrodes 26 is called an ionizer.

Opposite the tip of lightning rod 21 where flange 23 annularly extends, is parabolic reflector/conductor 27. Parabolic reflector/conductor extends radially from the lower end of lightning rod 21. Parabolic reflector/conductor 27 is firmly attached to lightning rod apparatus 100 by supports 30 and screws 31. Parabolic reflector/conductor 27 is also electrically isolated from lightning rod 21 by insulators 28, 29, and, of which insulators 28 and 29 are perforated by holes 33.

Parabolic reflector/conductor 27 operates to focus a beam of ions towards the tip of lightning rod 21. Parabolic reflector/conductor 27, together with flange 23, make up a joint ion accelerator-collimator, and produce an electric field that accelerates the ions produced at metallic points 26. The electric field produced causes the charged ions to move in a direction almost parallel to lightning rod 21, causing the ions produced at metallic points 26 to accelerate to high velocities creating an avalanche effect or a Townsend effect in the number of ions produced. The large number of metallic points, together with the strong electric field, provide the lightning rod apparatus of the present invention the ability to produce more ions than earlier lightning rod apparatuses. Since ions in the atmosphere about the tip of the lightning rod 21 cause the atmosphere to be more conductive, a lightning rod such as this one which produces more ions than earlier lightning rods will make the atmosphere about the tip of the lightning rod even more conductive, thus enabling the lightning rod to attract more lightning strikes and lightning strikes from further away than earlier lightning rods, thus providing better protection for a larger area from lightning strikes surrounding the lightning rod 21. The result is a more effective lightning rod apparatus that is able to protect a much larger area from lightning strikes than earlier lightning rod apparatuses. The multiplicity of ions produced are focussed near the tip of lightning rod 21. The ions serve to break down the dielectric rigidity of the atmosphere and to facilitate the formation of a return tracer in a lightning stroke.

While I have shown and described certain present preferred embodiments of the invention and have illustrated certain present preferred methods of practicing the same it is to be distinctly understood that the invention is not limited thereto but may be otherwise variously embodied and practiced within the scope of the following claims.

What is claimed is:

1. An apparatus for protecting objects in the vicinity of said apparatus from being struck by lightning, said apparatus comprising:

a lightning rod having a tip and a base opposite said tip, said lightning rod being electrically connected to ground at said base;

an ionizer comprising said lightning rod and a plurality of spaced-apart metallic points held at a fixed potential and electrically insulated from said lightning rod, said plurality of spaced-apart metallic points forming an array substantially coextensive with a length of said lightning rod and cylindrically disposed about the length of said lightning rod; and an ion accelerator having an upper metallic structure and a lower metallic structure, said upper metallic structure being closer to said tip of said lightning rod than said lower metallic structure, said ionizer disposed between said upper metallic structure of said ion accelerator and said lower metallic structure of said ion accelerator, said ionizer being disposed near and about said lightning rod.

2. The apparatus of claim 1, further comprised of said ion accelerator comprising an electrostatic accelerator.

3. The apparatus of claim 2, wherein said ion accelerator is a collimator.

4. The apparatus of claim 3, further comprising a concave reflector concentrically positioned about said base of said lightning rod, said concave reflector facing said tip of said lightning rod, said concave reflector being electrically conductive.

5. A lightning rod structure, comprising:

a lightning rod having a tip and a base opposite said tip, said lightning rod being electrically connected to ground at said base;

an accelerator for accelerating ions comprising a flange protruding annularly about said lightning rod extending towards said tip;

a parabolic reflector positioned concentrically about said base of said lightning rod, said reflector being concave and facing said tip of said lightning rod with said reflector being electrically conductive with a focus about said tip of said lightning rod; and a plurality of spaced-apart electrodes, each electrically isolated from said lightning rod and each held at a common potential in a circumferential array held spaced-radially apart from the entire length of said lightning rod, one end of each one of said plurality of electrodes being held in a vicinity of said lightning rod, said plurality of spaced-apart electrodes extending along the entire length of said lightning rod.

6. The lightning rod structure of claim 5, further comprised of one end of each of said plurality of spaced-apart electrodes forming an array extending entirely around said lightning rod.

7. A lightning rod structure, comprising:

a lightning rod having a length extending between a first end of said lightning rod and a second end of said lightning rod, said first end comprising the tip of the lightning rod and said second end electrically connected to ground;

an accelerator having an upper metallic structure and a lower metallic structure, said upper metallic structure being closer to said first end of said lightning rod than said lower metallic structure, said upper metallic structure being electrically connected to said lightning rod, and said lower metallic structure being electrically isolated from said lightning rod, said lower metallic structure of said accelerator comprising a parabolic reflector positioned concentrically about said second end of said lightning rod, said parabolic reflector being concave upwards towards said first end of said lightning rod; and a metallic emitter cylindrically disposed about said lightning rod between said upper metallic structure and said lower metallic structure, and from said second end of said lightning rod to near said first end of said lightning rod, said metallic emitter being electrically isolated from said lightning rod, said metallic emitter having a plurality of metallic points directed radially inward towards said lightning rod but remaining electrically isolated from said lightning rod, said plurality of metallic points surrounding said lightning rod and defining an array extending from said second end of said lightning rod to near said first end of said lightning rod.

8. The lightning rod structure of claim 7, wherein said plurality of metallic points of said metallic emitter are disposed between said upper metallic structure and said lower metallic structure of said accelerator.

9. The lightning rod structure of claim 8, wherein said upper metallic structure of said accelerator comprises a circular metallic flange disposed about said first end of said lightning rod.

* * * * *